March 24, 1970     F. C. BADALICH     3,502,405
SLIDE PROJECTOR WITH SLIDE EDITING CAPABILITY
Filed Nov. 14, 1966     2 Sheets-Sheet 1
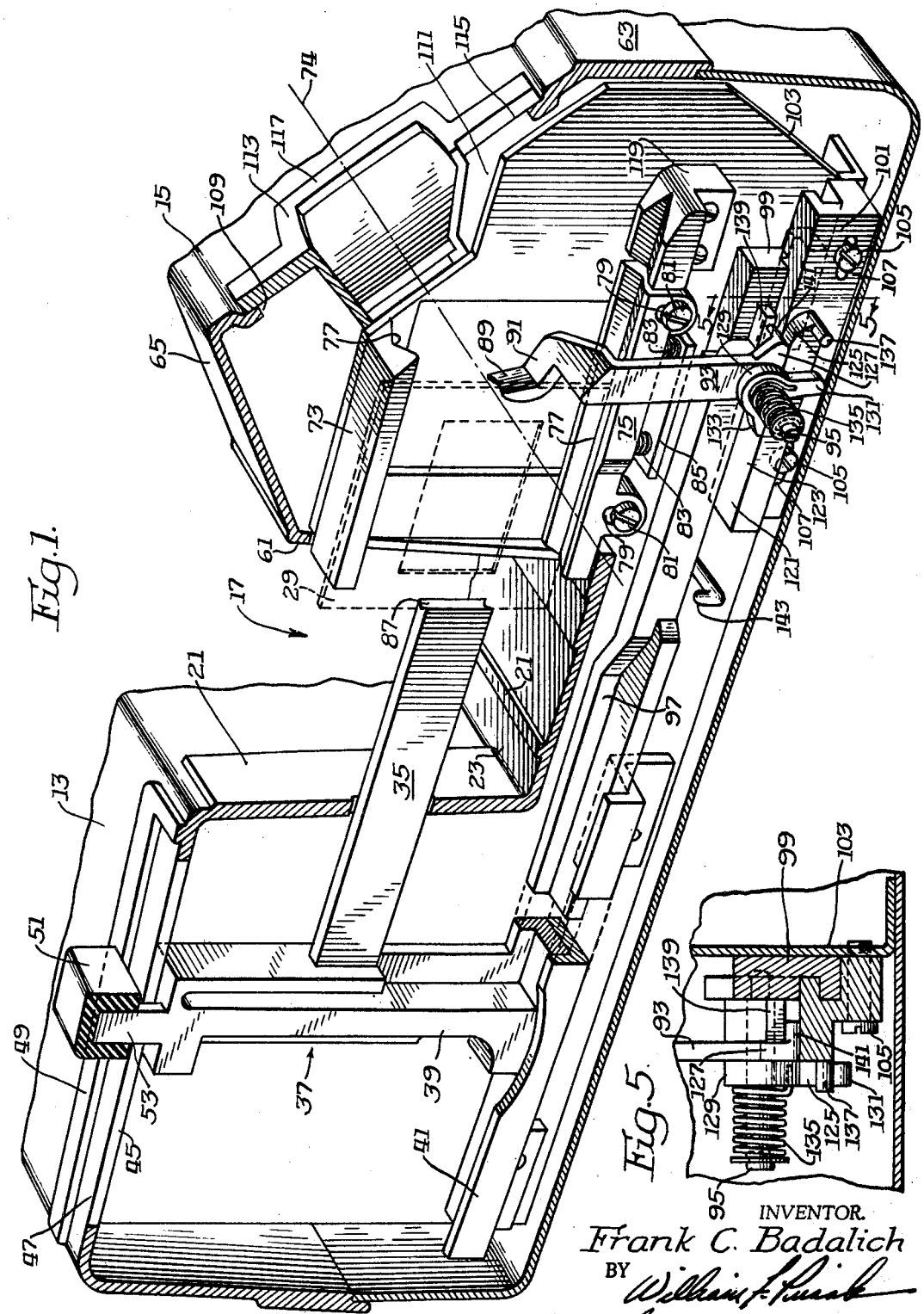
INVENTOR.
Frank C. Badalich
BY
Attys

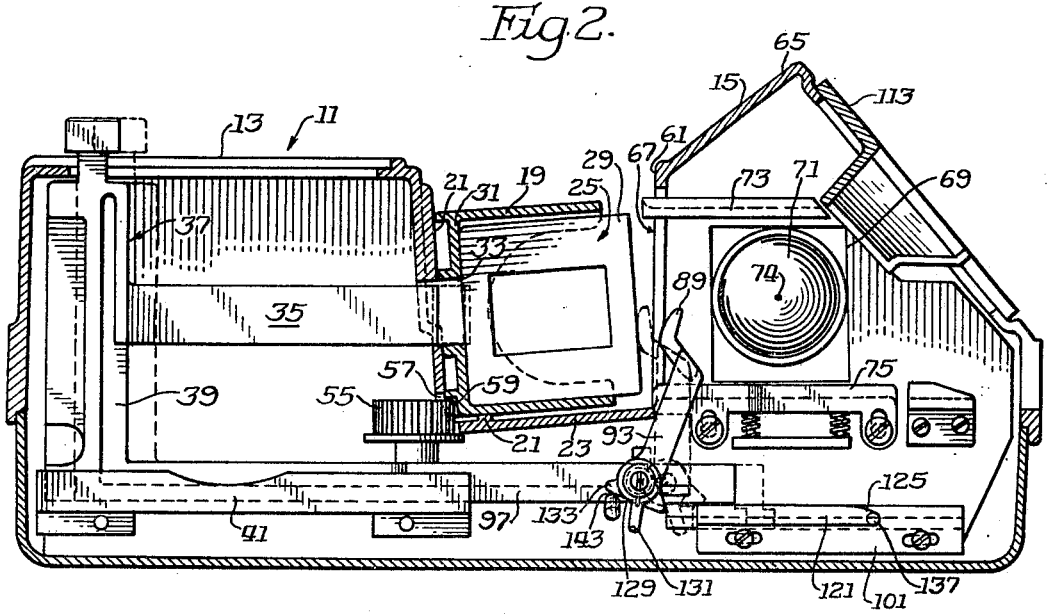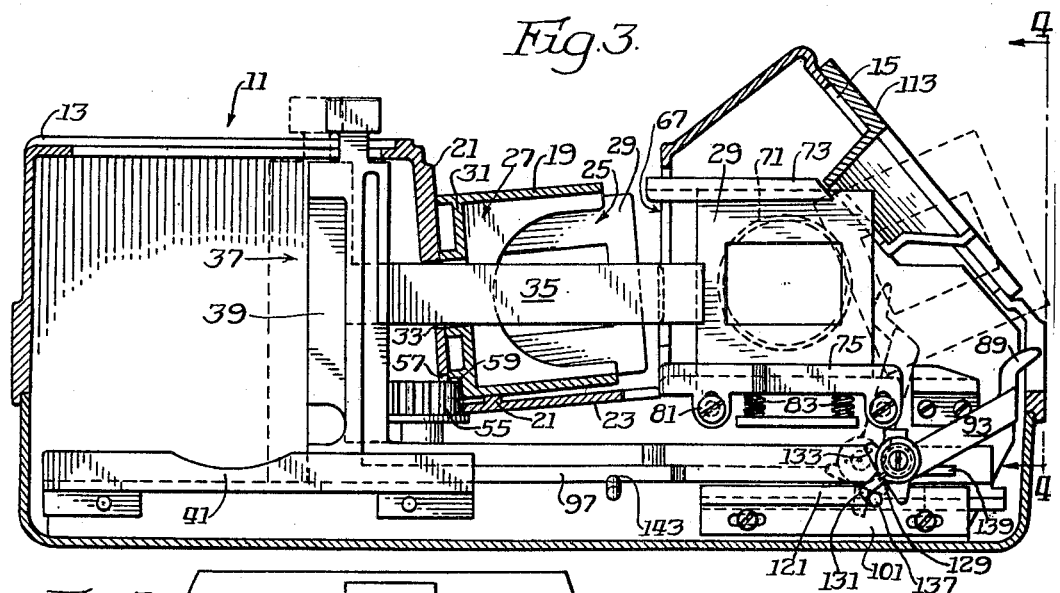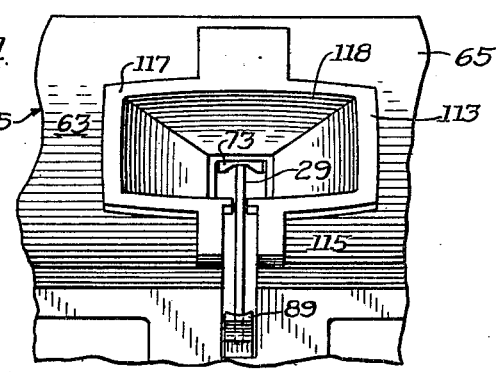

United States Patent Office 3,502,405
Patented Mar. 24, 1970

3,502,405
SLIDE PROJECTOR WITH SLIDE EDITING
CAPABILITY
Frank C. Badalich, Chicago, Ill., assignor to Bell &
Howell Company, Chicago, Ill., a corporation of
Illinois
Filed Nov. 14, 1966, Ser. No. 593,868
Int. Cl. G03b 21/00, 23/04
U.S. Cl. 353—21                    13 Claims

ABSTRACT OF THE DISCLOSURE

A slide projector with slide editing capability is provided with a slide transfer mechanism to move slides from a supply magazine into a projection station from which a slide if oriented erroneously, may be removed manually and re-inserted without displacement of any carrier mechanism of the projector. The transfer mechanism includes a slide control arm which is movable away from the frame of the slide as the slide moves into the projection station but returns to a slide control position to remove the slide from the station for return of the slide to the supply magazine.

---

The present invention relates to projectors for slide transparencies. Specifically it relates to means adapted to facilitate removal of a slide transparency from a slide projector for editing of that slide if oriented erroneously for projection.

Slide projector assemblies with which the present invention is concerned customarily comprise a removably mounted slide magazine in which a plurality of slide transparencies are prearranged for sequential removal to projection position in optical alignment with a projector lens system. Means are also provided for return of each slide after projection to its place in the magazine. Frequently, occasion arises for slide editing. For the latter purpose, it is desirable to remove a slide during projection rather than delay until after magazine removal from its projection assembly or until the projection sequence has been completed. Preferably, a slide removal facility of the indicated character should provide for slide conditioning in projection position to readily evaluate editing effect in the normal projection sequence.

It is an object of the present invention to provide an improved slide projector assembly of the class having a slide magazine arranged for feeding slides in sequence to a projection station with means to facilitate slide removal during projection sequence for editing and the like.

Another object of the invention is that the means to facilitate slide removal be conditioned for operation to permit slide removal from projection position.

A further object of the invention is that said means be arranged for slide removal from and return to projection position during each interval regularly used in normal projection sequences for the changing of slides held in the magazine.

The foregoing and other objects, features and advantages of the present invention will become more apparent upon consideration of the following description, when considered in conjunction with the accompanying drawings wherein the same reference numeral refers to like or corresponding parts throughout the several views.

On the drawings:

FIG. 1 is a perspective view of a section of a slide projector assembly embodying the present invention, parts being shown dotted and parts having been omitted for the purpose of illustration, a slide changing drive means being shown in an intermediate condition of reciprocation.

FIG. 2 is a elevational view of said projector assembly, parts being dotted for the purpose of illustration and showing said drive means conditioned at the beginning of a slide feeding stroke.

FIG. 3 is a view similar to FIG. 2, however showing a drive means conditioned with a slide in projection position, parts being dotted for the purpose of illustration.

FIG. 4 is a view taken substantially on the line 4—4 of FIG. 3 and looking in the direction of the arrows.

FIG. 5 is a vertical sectional view taken substantially on the line 5—5 of FIG. 1 and looking in the direction of the arrows.

Referring now more particularly to the drawings, there is shown a transparency slide projector assembly generally designated 11. It comprises a U-shaped housing having a drive section 13, a projector section 15, and an intermediate section 23. Housing sections 13 and 15 are horizontally spaced apart from each other and therebetween define a recess 17 above the housing section 23. A removable slide magazine 19, which may be of conventional linear construction and which has ben omitted in FIG. 1, is removably mounted in said recess. Magazine 19 is adapted to be sequentially advanced transversely of the longitudinal axis of the views of FIGS. 1, 2 and 3. To facilitate such movement, a pair of normally disposed anti-friction bearing strips 21 is carried on the outer normal surfaces of the housing sections 13 and 23 along which the magazine is slidable.

The magazine 19 comprises a plurality of longitudinally spaced apart partitions which form a plurality of adjoining slide chambers 27 (FIG. 3), respectively adapted to receive a plurality of transparency holding slide frames 29. The magazine has a side opening 25 extending substantially its entire length, said opening being proportioned to permit ejection therethrough of the slide frames 29 from chambers 27 into projection position and return of such slide frames from projection position into the magazine.

The magazine has a side wall 31 opposite the opening 25. The side wall has elongated passage means 33 communicatively connected with each slide chamber 27. A slide ejector arm 35 of a slide transfer mechanism is fashioned as a horizontal arm reciprocative into and out of said magazine through said passage means 33. Said slide ejector arm is proportioned for engagement in successive slide chambers to eject successive transparency frames 29 into projection position. The ejector arm 35 comprises a medial work extension of a Scotch yoke drive mechanism generally designated 37.

Scotch yoke drive mechanism 37 may be manually or motor driven and comprises a vertical bar or carrier 39 which is mounted for horizontal reciprocation in the housing section 13. To define the reciprocating movement of said Scotch yoke drive mechanism, a horizontal track section 41 is arranged within the lower end portion of the housing section 13 and provides a bearing for sliding support of the lower end of the bar or carrier 39. The housing section 13 has an elongated horizontal guide slot 45 in its upper wall 47 (FIG. 1). An anti-friction bearing strip 49 is disposed on the outside of wall 47 adjacent the slot 45. The bar 39 has an upwardly extending extension or neck 53 which vertically projects through and engages for horizontal reciprocation in slot 45. A bearing cap 51 is secured on the outer end of the neck 53 and is proportioned to extend over the opposite sides of the slot 45 in sliding engagement with strip 49 for horizontal reciprocation.

In the instant embodiment, a gear 55 is journalled within the housing section 13 and has an operative portion which extends through an opening 57 in said housing section 13. The opening 57 is in alignment with a gear rack 59 which is carried longitudinally of the magazine 19 on its wall 31. Through the opening 57, the gear 55 is adapted for driving mesh with the gear rack 59 to move the magazine longitudinally when it is mounted in operative position, as in FIGS. 2 and 3.

The ejector arm 35 is proportioned so that when it is in retracted condition (shown in solid lines in FIG. 2) it will be withdrawn from the magazine chambers 27 to preclude interference with an advancing of a chamber defining partition. The gear 55 is operated by indexing means (not shown) adapted to advance the magazine from one slide delivery position to the next synchronously with Scotch yoke drive mechanism 37 each time arm 35 is conditioned as in the solid line position of FIG. 2.

The projector housing section 15 has a drive proximate side wall 61, a drive distal side wall 63, and may have an angular top or upper wall 65. The side wall 61 has an opening 67 which is proportioned for slide passage and disposed in slide passing alignment with the magazine 19. A customary projection lens assembly 71 (FIG. 2) is operatively mounted in a lens housing extension 69 of housing section 15. The arrangement is such that the optical axis 74 (FIG. 1) of said lens assembly is normal to the path of slide movement between projection position and said magazine.

A slide support comprising a pair of slide holding guide or track members 73 and 75 is mounted in the housing section 15 behind the lens assembly 71. The members 73 and 75 are spaced apart by approximately the height of a transparency frame 29 and may have aligned guide grooves 77 adapted for reception of the top and bottom edges of a transparency frame for holding a slide in a vertical plane in projection alignment with said lens assembly. The slide holding members 73 and 75 have magazine proximate ends which are disposed in or about the housing opening 67 adjacent the magazine opening 25 in slide passing association therewith. In the illustrated embodiment, the proportioning of the parts is such that, at the beginning of the slide ejection stroke of ejector arm 35, an ejected slide frame 29 will be engaged by members 73 and 75 to be guided into projection position. As fashioned, the guide member 73 may be rigidly mounted. On the other hand, guide member 75 may be vertically adjustable within the limits of slots 79 (FIG. 1) in which there are engaged pins or screws 81 on which the track section 75 is hung. A pair of compression springs 83 at their upper ends bear against the bottom of guide member 75 and at their lower ends bear against a rigid shelf 85 disposed within the section 15. Spring 83 bias guide member 75 upwardly and permit accommodation by the slide support for variation in the vertical dimension of the slide frame 29 and also for normal variations in slide movement between the magazine and the projection position.

Ejector arm 35 is proportioned so that it is adapted upon extension to deliver an ejected slide frame into projection position intermediate the lens assembly 71. As illustrated, ejector arm 35 is adapted to engage the edge of such transparency frame 29 which is proximate housing section 13. To minimize slide frame shifting during slide translocation to and from the magazine from and to projection, ejector arm 35 has a vertical groove 87 (FIG. 1) in which such last mentioned frame edge engages. A shoe 89 is adapted to engage the opposite side of a transparency frame during translocation from and to magazine 19 to and from projection position.

Shoe 89 is carried at the upper outer end of an elbow 91 (FIG. 1) which as shown bends rearwardly from the shoe over the guide member 75. Said elbow is rigid and may be integral with said shoe 89 and with an upwardly extending rockable arm 93. A pin 95 (FIG. 1) provides a rotational axis for arm 93 at the lower end portion thereof. An elongated Scotch yoke drive extension or rigid horizontal arm 97 rigidly secures the pin 95 in its outer or drive distal end portion 99. The inner end portion of said rigid horizontal arm 97 projects from the lower end portion of bar 39, with which said last arm may be integral, outwardly from the drive housing section 13 through the intermediate housing section 23 into the lower end portion of the projector housing section 15. Accordingly, the rigid horizontal arm 97 is reciprocative with the Scotch yoke drive mechanism. The arm 97 is arranged so that during its reciprocation, its inner end portion is slidingly supported in the track 41.

A track section 101, which is elongated in the direction of movement of the Scotch yoke drive mechanism 37, is adjustably secured on a portion of mount means 103 which is rigid within the projector housing section 15. Track section 101 is hung on a pair of screws 105 secured to the mount means 103 and projecting through a pair of horizontally spaced apart slots 107 in said track section, said slots being proportioned to permit longitudinal adjustment of said last mentioned track section. The track section 101 slidingly supports the outer end portion 99 of the horizontal rigid arm 97. By reason of the foregoing, the ejector arm 35 and shoe 89 are reciprocative in fixed spaced apart relationship for moving or transferring a transparency frame 29 from the magazine to projection position and therefrom back to the magazine.

The upper wall 65 of the lens housing section 15 has an opening 109 which is connected with a chamber 111 formed in the housing section 15. A frame or gate 113 (FIG. 4) is mounted in said opening 109. The frame defines a slot 115 which is disposed for co-planar alignment with a transparency frame 29 when normally held in projection position. The slot 115 is disposed adjacent the magazine distal ends of members 73 and 75 so that a slide frame 29 normally disposed in projection position can be manually engaged from outside of chamber 111 for removal therefrom. An upper portion 117 of the frame 113 is outwardly flared from the slot 115 to provide an enlarged quarter 118 into which fingers of an operator can be extended to grip a transparency frame for removal and return to the chamber 111 within the housing section 15. A transparency frame guide 119 (FIG. 1) is secured to the mount means 103. The last mentioned guide is longitudinally aligned with the track member 75 and in frame receiving alignment with the slot 115 to guide a transparency frame into projection when it is reintroduced into chamber 111 through the opening 109.

It is appreciated that while a transparency frame 29 is gripped between portions of the slide transfer mechanism defined by the shoe 89 and the arm 35, removal through the opening 109 of the housing is not practical. To the end that removal can be accomplished when a transparency frame is disposed within the housing section 15, the track section section 101 has an integral and therefrom normally extending ledge or flat 121. Ledge 121 has an uper flat 123 (FIG. 1) which merges into a downwardly curved surface 125, the latter surface being disposed at the magazine distal end portion of said ledge 121. The rockable arm 93 is fashioned with a flared base 127 having a lower flat which is disposed and proportioned for sliding engagement along the flat 123 as the rigid horizontal arm 97 reciprocates. The lege 121 and arm 97 are proportioned in such a manner that the base 127 is adapted during reciprocation to be carried beyond opposite ends of the flat 123.

A dog or pawl 129 is informed integrally with the base 127. Pawl 129 has a pair of radially extending ears 131 and 133 which are arranged beyond the ledge 121 adjacent the back side thereof, distal the mount means 103, so that as the arm 97 reciprocates, the dog will ride along the rear of said ledge 121. A helical spring 135 which is arranged about an outer projection of the axis pin 95 has its opposite ends secured to said shaft and said pawl 129 in such a manner that the pawl will be urged counterclockwise with respect to FIG. 1 to bias the shoe 89 into transparency frame gripping condition.

A trip or catch 137 in the form of a pin or lug fashioned integrally with the ledge 121 adjoining surface 125 is arranged in the path of the ear 131 and serves to interrupt the level movement of the arm 93 as the rigid horizontal arm 97 is extended at the end of its transparency frame ejection stroke. The parts are arranged and proportioned in such a manner that upon the latter occurrence, the arm 93 will be rocked over the surface 125 carrying shoe 89 from the dotted line position to the solid line position shown in FIG. 3 as the Scotch yoke dirve mechanism 37 is moved during the last portion of its film ejection stroke. With the arm 93 in the solid line position of FIG. 3, the side of a transparency frame in projection position and proximate the opening 109 will be liberated from retention by shoe 89 and may be withdrawn from the housing section 15 through slot 115. The foregoing arrangement provides a convenient means for transparency editing and permits return of the removed or another transparency frame into projection position while the arm 93 is in the solid line position of FIG. 3.

When the return stroke of the Scotch yoke drive mechanism initiates, and as the arm 35 moves from the solid to the dotted line position of FIG. 3, base 127 will be carried from surface 125 into engagement with ledge 121, the return action being augmented by the biasing action of spring 135.

A retainer 139 (FIG. 1) having a lower flat is carried on the end portion 99 of the arm 97. The retainer is arranged to engage a base extension 141 which projects from flared base 127 to hold the arm 93 vertically, in transparency frame holding condition, once the base 127 is disposed above the flat 123. The retainer 139 is disposed relative the base extension 141 so that the arm 93 is free to rock as it is reciprocated beyond opposite ends of the flat 123.

The positive force or "push" for returning a transparency frame 29 from its projection station to the magazine is exerted by the shoe 89 as the Scotch yoke drive mechanism is reciprocated from the dotted line position of FIG. 3 to the dotted line position of FIG. 2. However, while shoe 89 is disposed in the dotted line position of FIG. 2, it will interfere with advancement of the magazine 19.

To the end that the arm 35, as well as the shoe 89, will completely disengage a transparency frame after it is settled against the magazine wall 31 upon return, the Scotch yoke drive mechanism will continue its movement from the dotted line position of FIG. 2 which corresponds to the condition of engagement of the frame 33 with the magazine wall 31, to the solid line position of FIG. 2 in which condition the arm 35 is free from its proximate edge of the transparency frame.

The ledge 121 is proportioned in such a manner that as the drive mechanism 37 moves to the solid line position from the dotted line position of FIG. 2, the base 127 will be carried beyond the flat 123. However, the shoe 89 will not follow into the magazine. That is because a trip 143 (shown in phantom in FIGS. 2 and 3) is arranged in a path of the ear 133 with the disposition of said trip 143 being such that as the arm 93 moves to the left with respect to FIG. 2—that is, toward the magazine 19—after a transparency frame has been completely seated in said magazine, the ear 133 will be engaged by said last trip in a manner to rotate or rock the arm 93 against the action of the spring 135 to disengage the shoe 89 and its proximate transparency frame edge. The magazine indexing means (not shown) is synchronized so that while the shoe 89 is thusly conditioned, the gear 55 will be operated to advance the magazine.

As the arm 35 commences its frame ejection stroke by moving from the solid line to the dotted line position shown in FIG. 2, the arm 97 is carried to the right with respect to FIG. 2 and causes disengagement of the ear 133 and the trip 143. Accordingly, the shoe 89 will be biased into transparency frame engaging condition but relative to a succeeding frame.

As many substitutions or changes could be made in the above described construction and as many apparently widely different embodiments of the invention could be constructed without departing from the scope and spirit thereof, it is intended that all matter contained in the accompanying specification shall be interpreted as being illustrative and not in a limiting sense.

The embodiments of the invention in which an exclusive property or privilege is claimed are defined as follows:

1. In a slide projector having a housing with a slide removal opening, a lens assembly defining an optical axis through a projection station defining a portion of a slide transfer path, said housing including means supporting a slide magazine having a plurality of slide retaining chambers, indexing means associated with said housing for indexing said magazine relative to said slide transfer path for positioning of a slide for movement into and out of said projection station, the invention comprising:

a slide transfer mechanism movable to transfer a slide along said slide transfer path between said magazine and said projection station;

said slide removal opening in said housing providing direct access to a slide in said projection station for manual transfer of a slide to and from said station;

said transfer mechanism including slide gripping means arranged to releasably grip a slide for movement thereof; and control means arranged in said housing to cause movement of said gripping means to release a slide when said slide is in said magazine, to release a slide when said slide is in said projection station, and to remove said gripping means clear of said slide removal opening when said slide is in said projection station whereby said slide is manually transferable directly through said slide removal opening relative to said slide transfer mechanism.

2. A slide projector as in claim 1 in which said slide removal opening is proportioned to enable manual removal from and return to said projection station of a slide.

3. A slide projector as in claim 1 wherein said gripping means of said slide transfer mechanism comprises a fixed arm and a removable arm arranged to selectively move a slide between said magazine and said projection station, said movable arm being movable to engage said slide and move same from said projection station to said magazine.

4. A slide projector as in claim 1 in which said slide transfer mechanism is reciprocable between said projection station and said magazine and said control means includes a trip disposed in the path of a portion of said gripping means to condition said gripping means for slide disengagement when a slide is in said projection station.

5. A slide projector as defined in claim 1 in which gripping means comprises a pair of arms arranged normally in horizontally spaced apart relationship to grip a slide from opposite sides, one of said arms relative to the other being rockably mounted and having a portion aligned with said control means for actuation to slide disengaging condition.

6. A slide projector as defined in claim 5 in which said movable arm is spring biased to slide engaging condition, said control means comprising a trip disposed in the reciprocative path of and to rock said last mentioned arm to slide disengaging condition.

7. A slide projector as defined in claim 1 in which the gripping means comprises a pair of horizontally simultaneously reciprocative arms having horizontally spaced apart slide engaging end portions for successively translocating a plurality of slides in opposite horizontal directions between said magazine and said support means; reciprocative carrier means for said arms, one of said arms being fixed to said carrier means, the other of said arms being rockably mounted from said carrier and normally biased to slide gripping condition; a track section disposed below said support means, said rockably mounted arm being arranged for sliding along said track, and trip means arranged adjacent one end of said track section to rock said arm for slide disengagement at a side of said support means adjacent said projection station.

8. A slide projector as defined in claim 7 in which said magazine is mounted for lineal movement in a path transversely to the path of movement of said reciprocative arms, one of said arms being arranged for successive projection through said magazine to impel successive slides toward said support means, said trip means comprising a trip member arranged to rock said other arm to disengage a slide at the side of said support means proximal said magazine to permit advancement thereof.

9. A slide projector as defined in claim 1 in which said magazine is mounted for movement in a lineal direction adjacent one side of said support means, said control means including an actuating member operative on said gripping means to disengage a slide returned from said support means to said magazine to facilitate advancement thereof.

10. A slide projector as defined in claim 1 in which said housing is arranged and proportioned so that a portion of a slide disopsed in projection position will extend through said slide removal opening.

11. A slide projector comprising a housing with a first and a second slide translocation opening disposed in spaced apart relationship; a lens assembly mounted in a portion of said housing and defining the optical axis of said projector; a lineal support member mounted between said slide translocation openings and arranged to hold a slide transversely along said optical axis in projection alignment with said lens assembly; a magazine mounted adjacent said first opening in delivery alignment therethrough with one side of said support member; indexing means for advancing said magazine in a lineal path transversely of said support member at successive intervals to align therewith successive magazine contained slides; an arm assembly biased to slide holding condition and arranged for reciprocation in a path parallel to said support member; and control means including trip means arranged to cause a portion of said arm assembly to disengage a slide at opposite ends of said support member, and to move clear of said slide removal opening at one end of said support member thereby to permit movement of the magazine upon slide return and removal of a slide direct from projection position.

12. A slide projector as defined in claim 11 in which the arm assembly defines a gripping means and comprises a biased assembly of a pair of arms arranged in opposed positions to grip a slide from opposite sides, said trip means being disposed in relatively fixed positions in the path of reciprocation of said assembly to condition the arms for slide release.

13. A slide projector as defined in claim 11 in which said arm assembly comprises a horizontally reciprocative carrier, a relatively fixed arm secured to said carrier and arranged for projection through said magazine to grippingly engage one side of a slide to impel successive slides onto said support member, a spring biased arm pivoted to said carrier and spaced from said relatively fixed arm to grippingly engage a slide from an opposite side, said trip means comprising a pair of fixed projections disposed along the path of said spring biased arm to cause it to rock to slide disengaging position as said arm assembly reciprocates.

References Cited

UNITED STATES PATENTS

| 2,969,711 | 1/1961 | Robinson et al. | 88—28 |
| 2,979,987 | 4/1961 | Brumley et al. | 88—28 |
| 3,079,840 | 3/1963 | McMaster et al. | 88—28 |
| 3,138,062 | 6/1964 | Maiershoffer | 88—28 |

JOHN M. HORAN, Primary Examiner

R. M. SHEER, Assistant Examiner

U.S. Cl. X.R.

353—116